No. 870,024. PATENTED NOV. 5, 1907.
T. A. EDISON.
APPARATUS FOR PRODUCING PERFORATED STRIPS.
APPLICATION FILED MAR. 24, 1905.
13 SHEETS—SHEET 3.

Attest:

Inventor:
Thomas A. Edison
by Frank L. Dyer, Atty.

No. 870,024.  
T. A. EDISON.  
PATENTED NOV. 5, 1907.  
APPARATUS FOR PRODUCING PERFORATED STRIPS.  
APPLICATION FILED MAR. 24, 1905.  
13 SHEETS—SHEET 8.

Attest:  
Edgworth Greene  
Delos Holden

Inventor:  
Thomas A. Edison  
by Frank L. Dyer, Atty.

No. 870,024. PATENTED NOV. 5, 1907.
T. A. EDISON.
APPARATUS FOR PRODUCING PERFORATED STRIPS.
APPLICATION FILED MAR. 24, 1905.

Attest:
Edgeworth Greene
Delos Holden

Inventor:
Thomas A. Edison
by Frank L. Dyer Atty.

No. 870,024. PATENTED NOV. 5, 1907.
T. A. EDISON.
APPARATUS FOR PRODUCING PERFORATED STRIPS.
APPLICATION FILED MAR. 24, 1905.

Attest:
Edgeworth Greene
Delos Holden

Inventor:
Thomas A. Edison
by Frank L. Dyer, Atty.

No. 870,024. PATENTED NOV. 5, 1907.
T. A. EDISON.
APPARATUS FOR PRODUCING PERFORATED STRIPS.
APPLICATION FILED MAR. 24, 1905.
13 SHEETS—SHEET 11.

Attest:
Edgeworth Greene
Delos Holden

Inventor:
Thomas A. Edison
by Frank L. Dyer, Atty.

No. 870,024. PATENTED NOV. 5, 1907.
T. A. EDISON.
APPARATUS FOR PRODUCING PERFORATED STRIPS.
APPLICATION FILED MAR. 24, 1905.
13 SHEETS—SHEET 12.

Attest:
Edgeworth Greene
Delos Holden

Inventor:
Thomas A. Edison
by Frank L. Dyer, Atty.

No. 870,024.　　　　　　　　　　　　　　　　　PATENTED NOV. 5, 1907.
T. A. EDISON.
APPARATUS FOR PRODUCING PERFORATED STRIPS.
APPLICATION FILED MAR. 24, 1905.

Attest:　　　　　　　　　　　　　　　　　　Inventor:
Thomas A. Edison
by
Frank L. Dyer, Atty.

UNITED STATES PATENT OFFICE.

THOMAS A. EDISON, OF LLEWELLYN PARK, ORANGE, NEW JERSEY, ASSIGNOR TO EDISON STORAGE BATTERY COMPANY, OF WEST ORANGE, NEW JERSEY, A CORPORATION OF NEW JERSEY.

APPARATUS FOR PRODUCING PERFORATED STRIPS.

No. 870,024.     Specification of Letters Patent.     Patented Nov. 5, 1907.

Application filed March 24, 1905. Serial No. 251,759.

*To all whom it may concern:*

Be it known that I, THOMAS A. EDISON, a citizen of the United States, residing at Llewellyn Park, Orange, county of Essex, and State of New Jersey, have invented certain new and useful Improvements in Apparatus for Producing Perforated Strips, of which the following is a specification.

My invention relates to the production of perforated strips of thin sheet metal, such for example, as are used for making pockets to contain active material in storage batteries. It has been found that the most economical manner to form such pockets is to take a long continuous ribbon of sheet metal and perforate and then electroplate the same before it is cut up into blanks from which the pockets are to be made. It is found in practice, however, that it is impossible to secure long continuous strips of uniform width. Such strips as are on the market vary in width to such an extent as to render them unfit for use for the purpose described, unless treated in some special manner.

It is the object of the present invention to provide apparatus by which a perforated strip of unvarying width may be produced from an ordinary commercial strip at one operation, and if desired, by a subsequent operation, a strip having eyeleted perforations such as is claimed in my application for Letters Patent, filed July 23, 1904, Serial No. 217,881, may be produced.

Reference is hereby made to the accompanying drawings wherein the same reference numerals are used to designate corresponding parts in the several views, of which
Fig. 3 is a broken plan view showing the major portion of the mechanism for guiding, perforating and cutting the strip.

Figure 1:
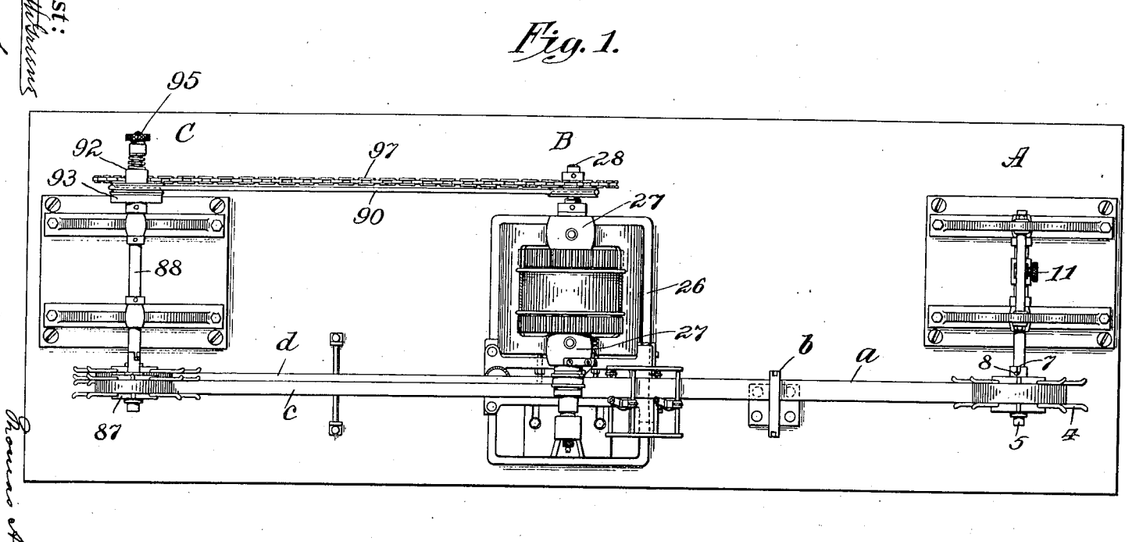
Figure 1 is a plan and Fig. 2 a side elevation showing one form of apparatus embodying my invention.
Figure 2:
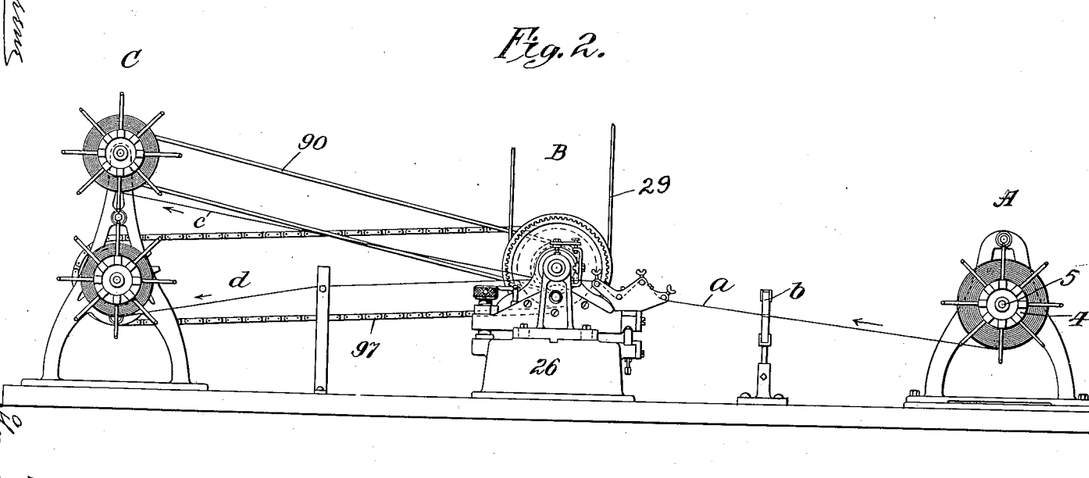

The apparatus shown consists broadly of three parts, namely, mechanism A for supplying a continuous strip of metal to be operated upon; mechanism B for continuously perforating and cutting the said strip; and mechanism C for continuously taking up the finished strip or strips (see Figs. 1 and 2).

Figure 17:
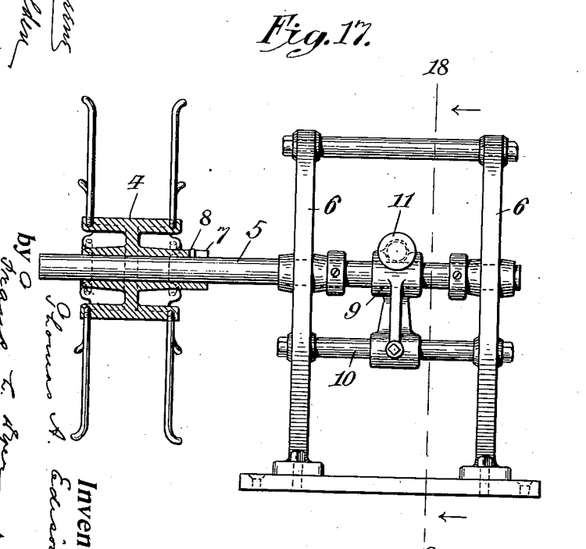
Fig. 17 is a rear elevation partly in section showing the supply reel and its support.
Figure 18:
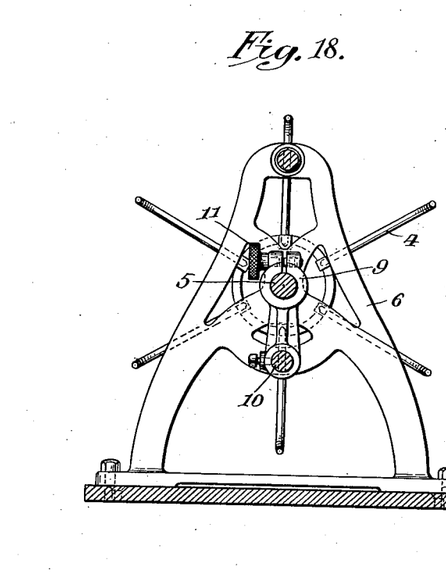
Fig. 18 is a section on the line 18—18 of Fig. 17.

The mechanism A (shown in detail in Figs. 17 and 18) comprises a reel 4 supported on a shaft 5, which is journaled in uprights 6, 6. The hub of the reel is slotted as shown at 7 for engagement with the pin 8 carried by the shaft 5, whereby the turning of the reel causes the shaft to turn and the reel may be readily slipped on or off the shaft. The rotation of the shaft 5 is retarded by means of a clamp 9 carried by the rod 10, and which may be tightened by means of the adjusting screw 11, so as to produce any desired amount of resistance to the turning of the shaft 5 and reel 4.

Figure 8:
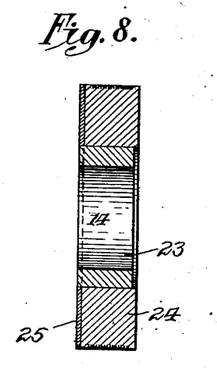
Figs. 8 and 9 are detail sectional views of the coöperating, perforating and cutting rolls.
Figure 9:
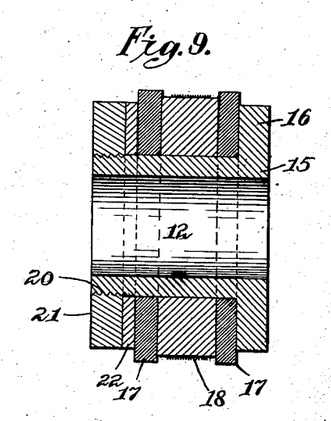

The perforating mechanism B comprises a pair of coöperating rolls 12 and 14. These members comprise coöperating circular male and female dies between which the strip is progressively moved. The roll 12 (see Fig. 9) comprises a sleeve 15 provided with a shoulder 16. Upon the sleeve is placed first a disk 17 then the circular male die 18 and then a second disk 17.
The end of the sleeve being threaded as shown at 20, a nut 21 is screwed on to the sleeve to hold the parts tightly together, a washer 22 being slipped on ahead of the nut, if necessary. The disks 17 are of greater diameter than the die 18 and are preferably of hardened steel, in order that either one of them may serve as a cutter in coöperation with a cutter carried by the roll 14. This latter roll (see Fig. 8) comprises a sleeve 23 carrying a circular female die 24, the depressions of which correspond with the elevations of the die 18.
The sleeve 23 projects slightly beyond the die 24 and upon this projecting portion is placed a thin disk 25 of hardened steel. The width of the parts 24 and 25 together is exactly the same as the distance between the disks 17 of the roll 12, so that when the dies are in their operative positions for perforating the strip of metal, the disk 25 is in shearing relation to one of the disks 17, whereby one edge of the strip will be trimmed at the same time that the perforations are formed. Obviously the cutters 17 and 25 may be readily replaced by others when the cutting edges become worn. When only one of the cutters 17 is worn, the roll 12 may be turned so as to bring the sharp cutter into action.

The mechanism for supporting and driving the perforating roll 12 comprises a base or bed plate 26 provided with journal boxes 27, 27, in which revolves the shaft 28. This shaft is driven by means of a belt 29 engaging a loose pulley 30 which carries a gear 31; the latter gear meshes with the gear 32 on the countershaft 33, and another gear 34 on the countershaft engages the gear 35 which is fixed to the shaft 28. One end of the shaft 28 is reduced in diameter and is supported in a removable journal box 36. This box is secured to the bed plate by means of bolts 37 and is slotted as shown at 38, so that upon loosening the bolts 37 the box 36 may be removed in a direction longitudinal to the shaft 28. The said shaft immediately within the journal 36 is threaded as shown at 39 for receiving a nut 40, whereby the perforating roll 12 is clamped against a collar 41 on the shaft 28. Obviously, the roll 12 may be readily removed from the shaft 28 by the removal of the journal 36 and nut 40.

Figure 5:
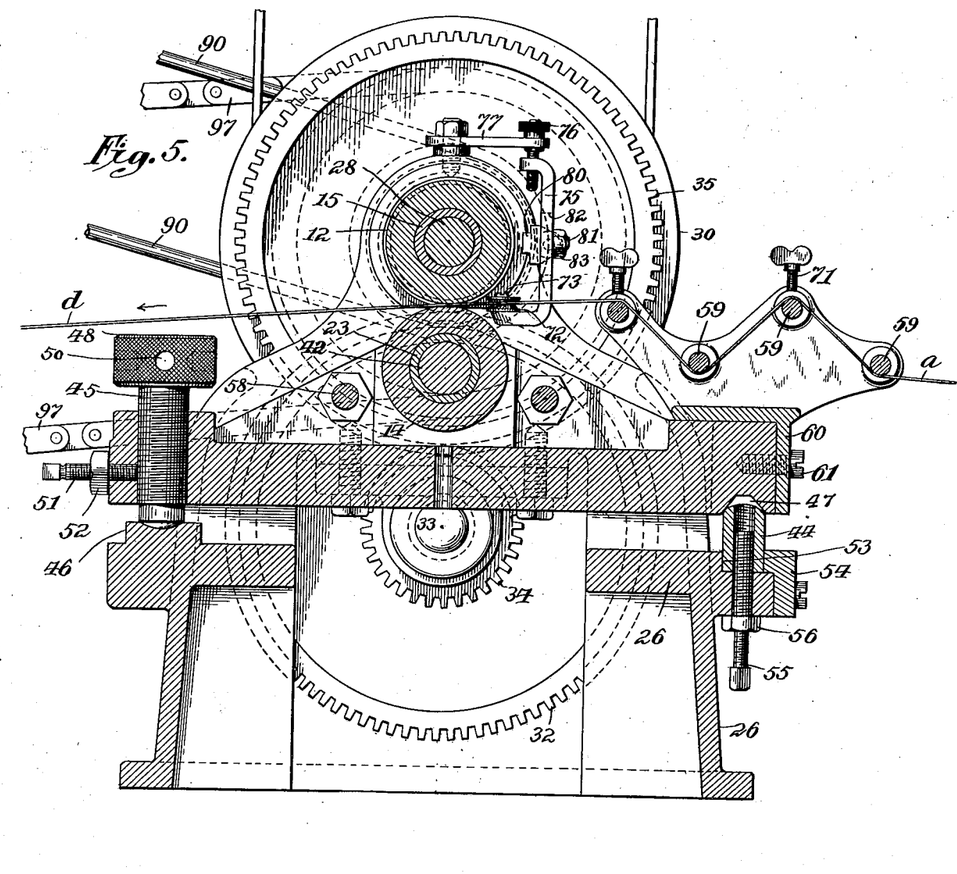
Fig. 5 is a section on the line 5—5 of Fig. 3.

The lower perforating roll 14 is carried on an arbor 42 which turns freely in the block 43 and is driven by the engagement of the dies 18 and 24. The block 43 is supported at one end by an adjustable slide 44 carried by the bed plate 26. The opposite end of the block 43 is supported by an adjusting screw 45 threaded therein and having its lower end rounded to bear in the cup 46 carried by the bed plate 26. The block 43 where it bears on the slide 44 is grooved as shown at 47 whereby the block 43 may turn upon the slide 44 as an axis when its opposite end is raised or lowered by means of the adjusting screw 45. The thread of the latter is sufficiently fine to provide a very delicate vertical adjustment of the axis of the lower perforating roll 14, and in order to indicate the amount of adjustment the head of the adjusting screw is provided with graduations 48, which coöperate with the pointer 49 carried by the block 43 (see Fig. 3.) The head of the adjusting screw is bored as shown at 50 for convenience in turning, and the screw 45 is held in adjustment by a set screw 51, provided with a jam nut 52. The slide 44 (see Figs. 5 and 6) rests upon the bed plate 26 in a groove formed by the shoulder 53 and the plate 54. A screw 55 is threaded in the bed plate immediately below each end of the slide 44, whereby the same may be tilted at any desired angle, that is, the slide may be either horizontal or either end may be raised or lowered with respect to the other end. This adjustment provides for varying the direction of the axis of the perforating roll 14, whereby any departure from parallelism of the axes of the rolls 12, 14 may be overcome and a perfect cutting and perforating operation performed. The slide 44 is held down by means of the screw 56 passing loosely through the bed plate 26 and threaded in the slide 44. The lateral position of the block 43 with respect to the bed plate 26 is determined by means of adjusting screws 57, 57 for moving the block in one direction and adjusting screws 58, 58 for moving the same in the opposite direction (see Figs. 3 and 7).

Figure 3:
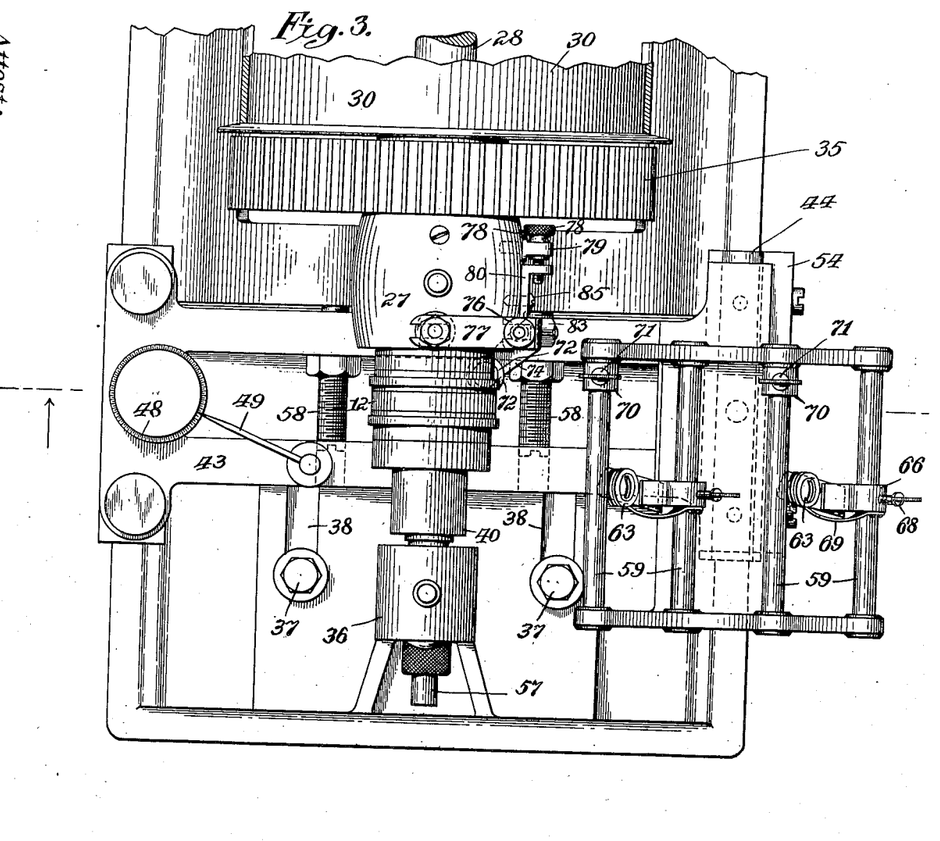
Figure 4:
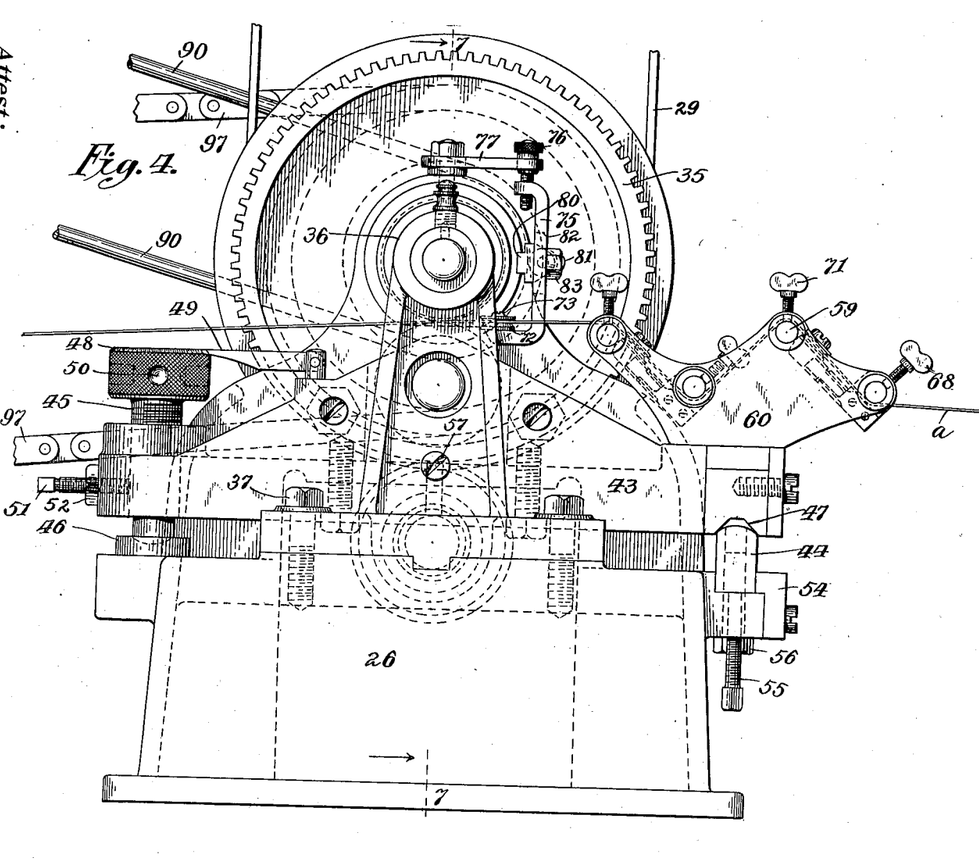
Fig. 4 is an end elevation of Fig. 3.
Figure 6:
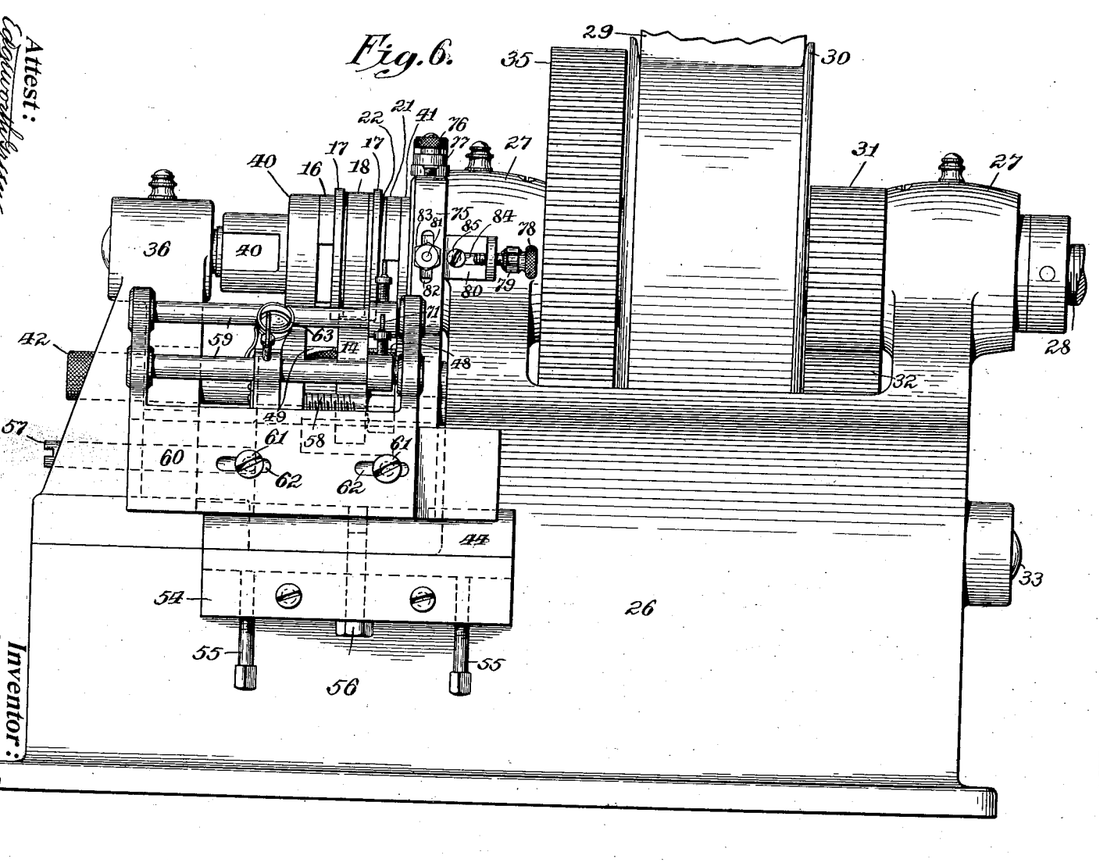
Fig. 6 is a rear elevation of the mechanism shown in Figs. 3 and 4.
Figure 7:
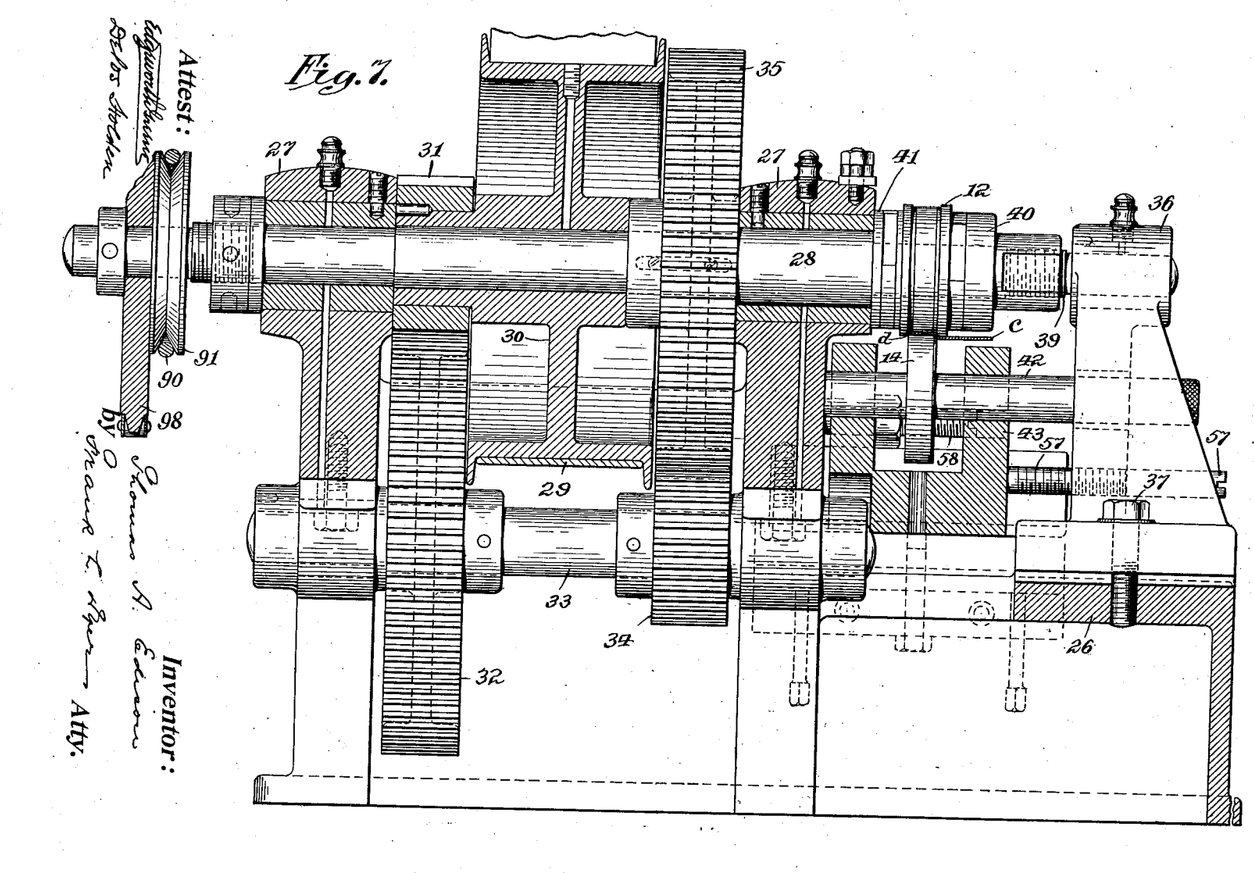
Fig. 7 is a section on line 7—7 of Fig. 4.
Figure 10:
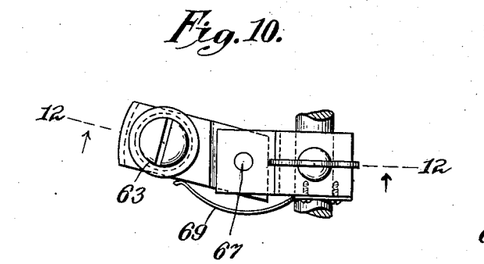
Figs. 10 and 11 are detail views showing one of the spring pressed guides for guiding the flexible strip during its progress through the machine.
Figure 11:
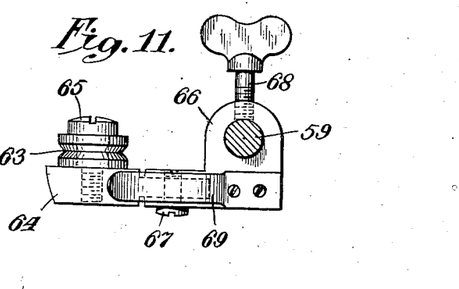
Figure 12:
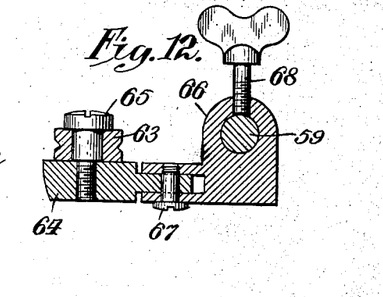
Fig. 12 is a section on the line 12—12 of Fig. 10.
Figure 13:
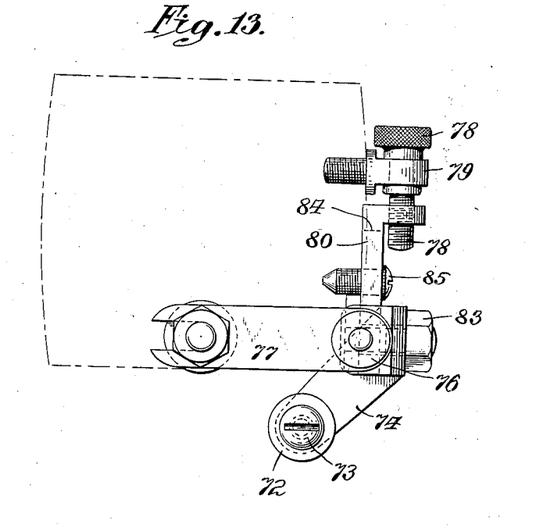
Figs. 13, 14 and 15 are views showing in plan, side and rear elevation respectively, the adjustable guide situated near the perforating rolls and used for guiding the flexible strip.
Figure 14:
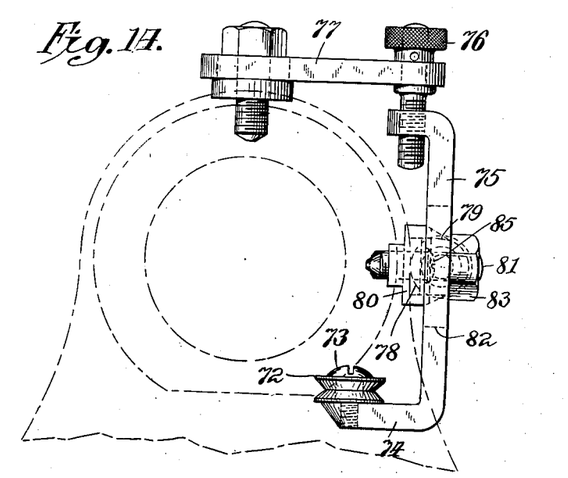
Figure 15:
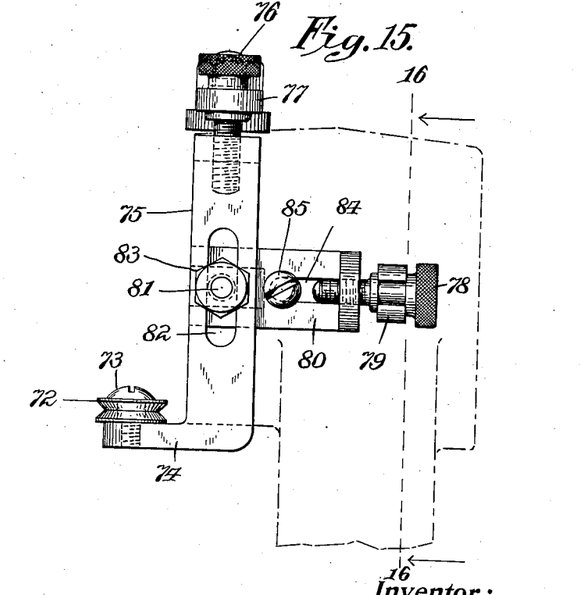
Figure 16:
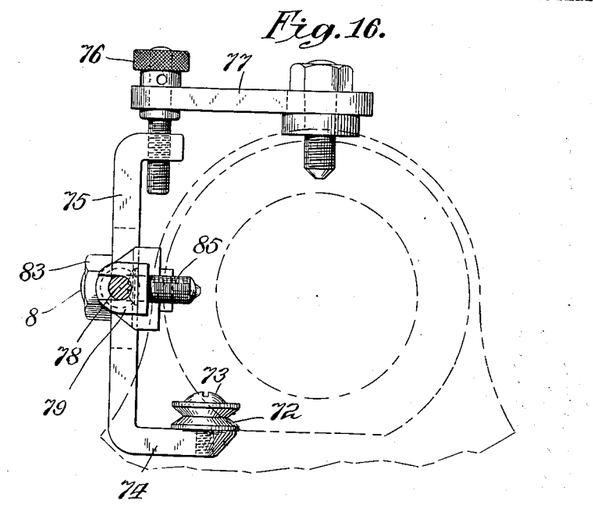
Fig. 16 is a section on line 16—16 of Fig. 15.

While it is possible to obtain a strip suitable for my purpose by trimming both edges of the stock, $a$, it is more economical and equally satisfactory to keep one edge of the stock in perfect alinement at all times by means of guides and to trim the same only at its opposite edge. I have therefore provided means for alining one edge of the stock with respect to the perforating rolls, so that it will be unnecessary to trim the same. The strip $a$ after leaving the supply reel 4 passes through a wiper $b$ formed preferably of felt, for removing practically all scale from the strips, to the transverse rods 59 carried by the plate 60, which is adjustably supported by means of holding screws 61 passing through slots 62 (Fig. 6). These rods cause the strip to follow a zigzag course, thereby frictionally retarding its progressive movement. Upon one or more of the rods 59 are spring pressed guides shown in detail in Figs. 10 to 12. The guide proper consists of a grooved button 63 screwed to a block 64, by a screw 65. The block 64 is pivoted to a piece 66 by a pin 67. The piece 66 is sleeved on one of the rods 59 and held in any desired position by means of a set screw 68. Upon one side of the piece 66 is secured a spring 69, the free end of which presses against the side of the block 64 as shown. The grooves of the guides 63 receive the outer edge of the strip and press the strip laterally against guides 70 which are sleeved on the rods 59 and held in any desired position by set screws 71. Another guide is provided for the inner edge of the strip $a$ immediately in the rear of the perforating rolls. This guide is shown in detail in Figs. 13 to 16 and is in the form of a grooved button 72 secured by a screw 73, to an outwardly extending arm 74 of the member 75. This member may be adjusted vertically by means of an adjusting screw 76 mounted in an arm 77 which is bolted to the journal box 27, as shown in Fig. 3. The member 75 is capable of lateral adjustment by means of an adjusting screw 78, mounted in an eye 79 screwed to the journal box 27. The adjusting screw 78 is threaded in the piece 80 which is provided with a stud 81 passing through a slot 82 of the member 75, and the latter is firmly held in any desired position of adjustment by a nut 83. The member 80 is provided with a slot 84 which receives a screw 85 threaded into the journal box 27 for clamping the member 80 in its adjusted position. The disk 17 of the perforating roll 12 which is nearest the guide 72, also acts as a guide for the inner edge of the strip.

In practice it is found that strips of metal suitable for being operated on by the apparatus herein described, can be obtained from manufacturers in various widths. I find that strips having a width of three inches can be readily handled and as the perforated strips which are generally used in the makeup of Edison storage batteries are a little less than three-quarters of an inch wide, I am able to obtain from three inch stock four of the perforated strips. This is done, of course, by running the material through the apparatus four times, at each operation removing a perforated strip of the requisite width. Since the inner edge of the stock corresponds with the inner edge of the finished strip and the cutters operate to form the outer edge of the finished strip, it is evident that there is no waste of material till the last operation upon the stock, at which time there will be a very narrow ribbon removed from the fourth perforated strip, which being too narrow to use, forms so much waste. But when stock is used which is only a little wider than the finished strip, there will necessarily be a strip of waste corresponding to every strip of finished product.

Figure 19:
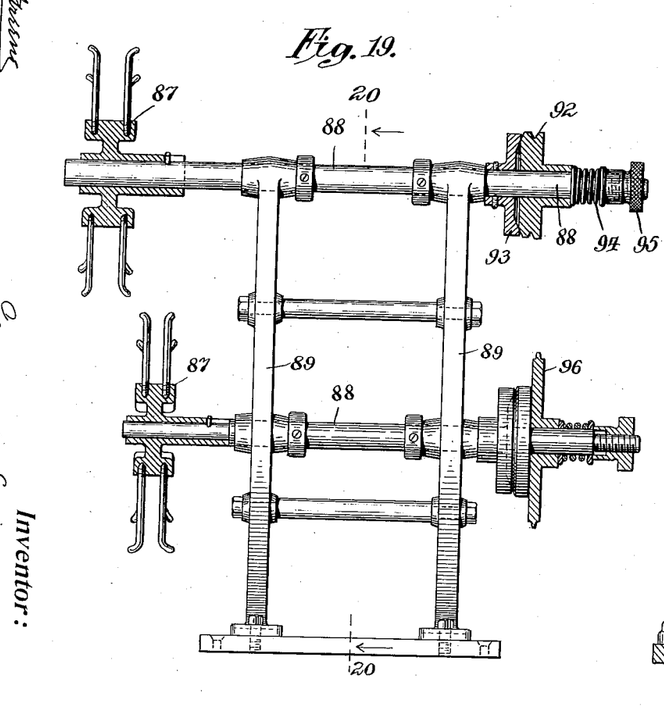
Fig. 19 is a rear elevation partly in section of the take-up reels and their support.
Figure 20:
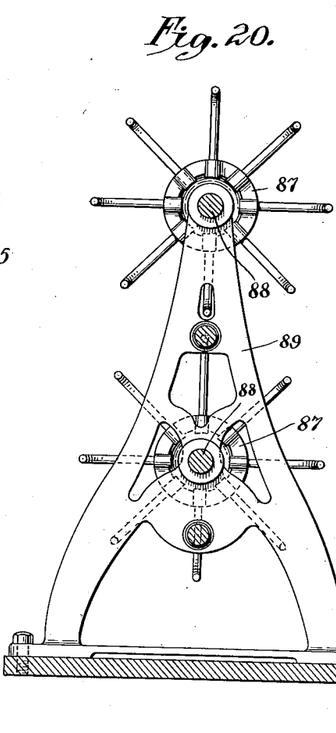
Fig. 20 is a section on line 20—20 of Fig. 19.

In order to use a strip of stock which is sufficiently wide to form two or more perforated strips, I provide two take-up reels 87, 87 one for receiving the perforated strip and the other for receiving what remains of the stock after the perforated strip has been separated therefrom. The axes of the reels are in different horizontal planes, as shown in Figs. 2, 19 and 20, whereby the strips c and d into which the original stock is divided by the cutters on the perforating rolls are separately recovered without danger of becoming entangled with each other, and whereby a direct pull can be obtained upon each of said strips in the direction of its length. The reels 87 may be similar in structure to the reel 4 previously described, differing only in width. Each of the reels 87 is mounted on a shaft 88 journaled in uprights 89. The reels are preferably driven from the main shaft 28, the upper reel being shown as driven by a belt 90 passing around a pulley 91 on said main shaft and around a pulley 92 loosely mounted on the shaft 88; the pulley 92 forms one member of a friction clutch, the other member being a cupped disk 93 keyed to the shaft, the member 92 being pressed against the concave face of said disk by a spring 94 surrounding the shaft 88 and held under compression by an adjusting nut 95 threaded on the end of the said shaft. The mechanism for driving the lower reel is the same as that just described, except that the pulley 92 is replaced by a sprocket 96, which is operated by a chain 97 and sprocket 98 carried by the main shaft 28. Obviously the friction connections will insure a steady application of power to the reels 87, and will prevent the power from exceeding a certain limit, whereby danger of breaking or tearing the strips is avoided. The pressure of the spring 94 and therefore the amount of pull upon each of the strips can be regulated by the nuts 95.
The operation of the apparatus is briefly as follows: A strip of stock a of any desired width, on a reel 4 corresponding in width thereto is placed upon the shaft 5. The stock passes thence through the wiper b and in a zigzag manner under and over the guide rods 59, the inner edge of said strip being pressed by the guides 63 against the fixed guides 70, 72. From the latter, it passes between the perforating rolls by which it is simultaneously perforated and cut, thereby forming two strips c and d one of which d is a perforated strip and the other of which, c, constitutes the balance of the stock which may be operated upon again to form another perforated strip in case it is of sufficient width, but otherwise it is merely waste. The strips c and d are thereupon caused to pursue paths one of which is above the other and are passed around reels 87 of appropriate width, which are used for taking up the strips progressively, and which furnish the necessary tension for drawing the strips through the apparatus, overcoming the drag caused by the guides, guide rods, and retarding device 9, the reels 87 being provided with frictional driving means whereby breaking or tearing of the strips is prevented.

Figure 21:
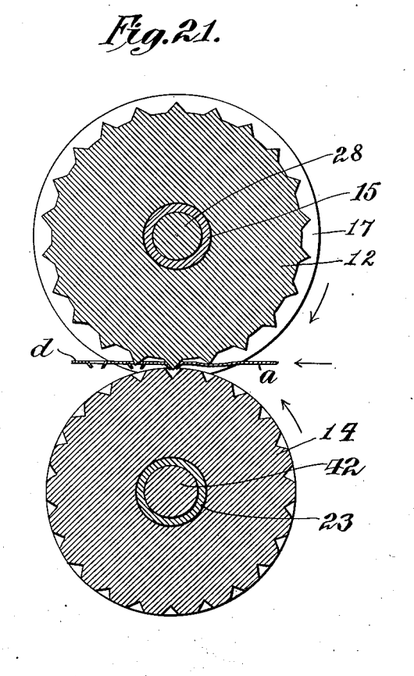
Figs. 21 and 22 are sectional views of the rolls 12 and 14 with the projections and depressions of the dies greatly exaggerated, the two figures being illustrative of means for producing strips of perforated sheet metal in which the metal surrounding the perforations is eyeleted or upset.
Figure 22:
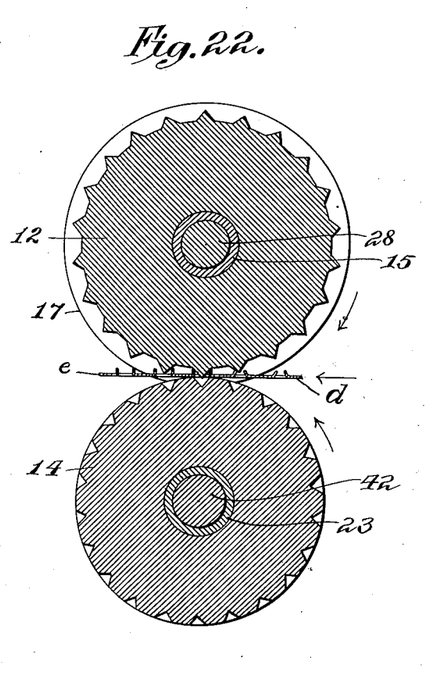

The elevations and depressions of the surfaces of the coöperating dies for forming the perforations are such as to form perforations which are surrounded by metal inclined to the body of the strip at less than a right angle. It is sometimes desirable to form perforations wherein the metal surrounding the same is inclined as much as or more than a right angle. Such perforations may be formed by passing a strip d which has been perforated in the manner heretofore described, between the rolls 12 and 14 a second time (or between rolls similar thereto), but with a reversal of the strip and rolls with respect to each other; that is, by running the strip through in the same direction as before, but turned over, or else with the rolls reversed with respect to the strip (see Figs. 21 and 22). In this case an eyeleting or upsetting operation is performed by the male die, so that a strip e is produced wherein the metal surrounding the perforations is bent so that its inclination to the body of the strip is equal to or greater than a right angle.

Having now described my invention, what I claim as new therein and desire to secure by Letters Patent is as follows:

1. In an apparatus of the character described, a pair of coöperating perforating rolls, means for progressively feeding to said rolls a strip of material of greater width than the working surfaces of the rolls, means for guiding one edge of said strip into alinement with one edge of said surfaces, and means for continuously separating the perforated and unperforated portions of the strip, substantially as set forth.

2. In an apparatus of the character described, a pair of coöperating perforating rolls, means for progressively feeding to said rolls a strip of material of greater width than the working surfaces of the rolls, means for guiding one edge of said strip into alinement with one edge of said surfaces, and means in alinement with the other edge of said surfaces for continuously separating the perforated and unperforated portions of the strip, substantially as set forth.

3. In an apparatus of the character described, a pair of coöperating perforating rolls, means for progressively feeding to said rolls a strip of material of greater width than the working surfaces of the rolls, means for guiding one edge of said strip into alinement with one edge of said surfaces, and coöperating cutting edges carried by the rolls for continuously separating the perforated and unperforated portions of the said strip, substantially as set forth.

4. In an apparatus of the character described, a pair of coöperating perforating rolls, means for progressively feeding to said rolls a strip of material of greater width than the working surfaces of the rolls, means for guiding one edge of said strip into alinement with one edge of said surfaces, and coöperating cutting edges carried by the rolls and occupying the same plane as the other edge of said surfaces for continuously separating the perforated and unperforated portions of the said strip, substantially as set forth.

5. In an apparatus of the character described, a pair of coöperating perforating rolls, means for progressively feeding to said rolls a strip of material of greater width than the working surfaces of the rolls, one or more guides in alinement with one edge of said surfaces, means for pressing one edge of said strip against said guides and means for continuously separating the perforated and unperforated portions of the said strip, substantially as set forth.

6. In an apparatus of the character described, a pair of coöperating perforating rolls, means for progressively feeding to said rolls a strip of material of greater width than the working surfaces of the rolls, one or more guides in alinement with one edge of said surfaces, means for pressing one edge of said strip against said guides, and coöperating cutters carried by the rolls for continuously separating the perforated and unperforated portions of the said strip, substantially as set forth.

7. In an apparatus of the character described, a pair of coöperating perforating rolls, means for progressively feeding to said rolls a strip of material of greater width than the working surfaces of the rolls, one or more guides in alinement with one edge of said surfaces, one or more spring pressed guides for pressing said strip laterally against said first guides, and means for continuously separating the perforated and unperforated portions of the said strip, substantially as set forth.

8. In an apparatus of the character described, a pair of coöperating perforating rolls, means for progressively feeding to said rolls a strip of material of greater width than the working surfaces of the rolls, one or more guides in alinement with one edge of said surfaces, one or more spring pressed guides for pressing said strip laterally against said first guides and coöperating cutting edges carried by the rolls for continuously separating the perforated and unperforated portions of the said strip, substantially as set forth.

9. In an apparatus of the character described, a pair of coöperating perforating rolls, means for progressively feeding to said rolls a strip of material of greater width than the working surfaces of the rolls, one or more guides capable of lateral adjustment into alinement with one edge of said working surfaces, means for pressing one edge of said strip against said guides and means for continuously separating the perforated and unperforated portions of said strip, substantially as set forth.

10. In an apparatus of the character described, a pair of coöperating perforating rolls, means for progressively feeding to said rolls a strip of material of greater width than the working surfaces of the rolls, a guide, means for holding said guide in various positions of vertical adjustment, means for pressing one edge of said strip against said guide and means for continuously separating the perforated from the unperforated portions of said strip, substantially as set forth.

11. In an apparatus of the character described, a pair of coöperating perforating rolls, means for progressively feeding to said rolls a strip of material of greater width than the working surfaces of the rolls, a vertically and laterally adjustable guide, means for pressing one edge of said strip against said guide and means for continuously separating the perforated and unperforated portions of said strip, substantially as set forth.

12. In an apparatus of the character described, a pair of coöperating perforating rolls, means for progressively feeding to said rolls a strip of material of greater width than the working surfaces of the rolls, one or more guides in alinement with one edge of said surfaces, one or more laterally adjustable spring pressed guides for pressing said strip laterally against said first guides, and means for continuously separating the perforated and unperforated portions of the said strip, substantially as set forth.

13. In an apparatus of the character described, a pair of coöperating perforating rolls, means for progressively feeding to said rolls a strip of flexible material, a plurality of guide rods so placed as to deflect and frictionally retard the said strip, and guides laterally adjustable on said rods, substantially as set forth.

14. In an apparatus of the character described, a pair of coöperating perforating rolls, means for progressively feeding to said rolls a strip of flexible material, a plurality of laterally adjustable guide rods so placed as to deflect and frictionally retard the said strip, and guides laterally adjustable on said rods, substantially as set forth.

15. In an apparatus of the character described, a roll or die support consisting of a frame or block supported at its rear on a slide and at its front on a vertical adjusting screw, substantially as set forth.

16. In an apparatus of the character described a support for a roll or die consisting of a frame or block supported at its rear on a slide and at its front on a vertical adjusting screw, and means for laterally adjusting said block, substantially as set forth.

17. In an apparatus of the character described, a support for a roll or die, consisting of a frame or block supported at its rear on a slide and at its front on a vertical adjusting screw, and means for tilting said slide in a vertical plane, substantially as set forth.

18. In an apparatus of the character described, a support for a roll or die consisting of a frame or block 43 supported at its rear on a slide 44 and at its front on a vertical adjusting screw 45, and a laterally adjustable guide plate 60 carried by said frame, substantially as set forth.

19. In an apparatus of the character described, a pair of coöperating perforating rolls, means for guiding a strip of sheet metal through said rolls with one edge in alinement with one edge of the working surfaces thereof, means for longitudinally severing said strip, and a pair of reels for separately receiving the two parts of said severed strip, substantially as set forth.

20. In an apparatus of the character described, a pair of coöperating perforating rolls, means for guiding a strip of sheet metal through said rolls with one edge in alinement with one edge of the working surfaces thereof, means for longitudinally severing said strip, a pair of reels for separately receiving the two parts of said severed strip, means for driving said reels, and frictional connections interposed between said reels and said driving means, substantially as set forth.

21. In an apparatus of the character described, a pair of coöperating perforating rolls, means for guiding a strip of sheet metal through said rolls with one edge in alinement with one edge of the working surfaces thereof, means for longitudinally severing said strip, a pair of reels for separately receiving the two parts of said severed strip, means for separately driving said reels, and frictional connections interposed between each of said reels and said driving means, substantially as set forth.

22. In an apparatus of the character described, a pair of coöperating perforating rolls, means for guiding and feeding a strip of sheet metal through said rolls with one edge in alinement with one edge of the working surfaces thereof, a revoluble supply reel for said strip and means for retarding the revolution of said reel, substantially as set forth.

23. In an apparatus of the character described, a pair of coöperating perforating rolls, means for guiding and feeding a strip of sheet metal through said rolls with one edge in alinement with one edge of the working surfaces thereof, a supply reel carried by a revoluble shaft and a friction clamp applied to said shaft for retarding its movement, substantially as set forth.

24. In an apparatus of the character described, a body or bed plate, an outwardly movable journal block, means for clamping said journal block to said bed plate, a driven shaft having a reduced end journaled in said block and a threaded portion adjacent thereto, a removable perforating roll carried by said driven shaft, and a nut threaded on said shaft for securing said roll, substantially as set forth.

This specification signed and witnessed this 23rd day of March 1905.

THOMAS A. EDISON.

Witnesses:
DELOS HOLDEN.
FRANK L. DYER.